United States Patent
Davis

(12) United States Patent (10) Patent No.: US 6,633,981 B1
Davis (45) Date of Patent: Oct. 14, 2003

(54) ELECTRONIC SYSTEM AND METHOD FOR CONTROLLING ACCESS THROUGH USER AUTHENTICATION

(75) Inventor: Derek L. Davis, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/336,009

(22) Filed: Jun. 18, 1999

(51) Int. Cl.[7] ............................................. G06F 01/24
(52) U.S. Cl. ...................... 713/189; 713/155; 713/159; 713/182; 713/185
(58) Field of Search .................. 713/155, 156, 713/159, 161, 168, 172, 182, 185, 200, 201, 189

(56) References Cited

U.S. PATENT DOCUMENTS

| | | | |
|---|---|---|---|
| 4,811,393 A | 3/1989 | Hazard | |
| 4,860,352 A | 8/1989 | Laurance et al. | |
| 5,153,581 A | 10/1992 | Hazard | |
| 5,280,527 A | * 1/1994 | Gullman et al. | ............ 713/184 |
| 5,371,794 A | 12/1994 | Diffie et al. | |
| 5,473,692 A | 12/1995 | Davis | |
| 5,481,611 A | 1/1996 | Owens et al. | |
| 5,539,828 A | 7/1996 | Davis | |
| 5,568,552 A | 10/1996 | Davis | |
| 5,633,932 A | 5/1997 | Davis et al. | |
| 5,751,809 A | 5/1998 | Davis et al. | |
| 5,796,840 A | 8/1998 | Davis | |
| 5,805,706 A | 9/1998 | Davis | |
| 5,805,712 A | 9/1998 | Davis | |
| 5,818,939 A | 10/1998 | Davis | |
| 5,844,986 A | 12/1998 | Davis | |
| 6,311,273 B1 | * 10/2001 | Helbig | ........................ 713/200 |

* cited by examiner

*Primary Examiner*—Thomas R. Peeso
(74) *Attorney, Agent, or Firm*—Blakely, Sokoloff, Taylor & Zafman LLP

(57) ABSTRACT

A Basic Input/Output System (BIOS) device is designed to control access to a portion of BIOS code loaded in its internal memory. For example, during a boot process, an internal state machine permits access to the portion of the BIOS code in response to authentication of a portable token in communication with the BIOS device. Otherwise, the BIOS device precludes access to the portion of the BIOS code until the portable token is authenticated.

29 Claims, 6 Drawing Sheets

ELECTRONIC SYSTEM AND METHOD FOR CONTROLLING ACCESS THROUGH USER AUTHENTICATION

BACKGROUND

1. Field

The present invention relates to the field of data security. More particularly, this invention relates to an electronic system and method for controlling access to stored information through enforcement of an improved user authentication technique.

2. General Background

In today's society, it has become necessary to protect information stored within a computer in order to prevent unauthorized persons from downloading information onto a floppy disk, digital tape or other type of storage device. In certain situations, this information may be sensitive in nature such as a trade secret or privileged information. The importance of controlling user access to information stored on a computer has encouraged the creation of different access control mechanisms.

Many conventional access control mechanisms are operating system (OS) dependent. For example, in a computer-based password mechanism, user authentication involves the OS requesting the user to manually enter a password after completion of the boot process. The password may be entered via an alphanumeric keyboard or a keypad. If the entered password matches a password locally stored at system configuration of the computer, the user is granted access to the stored information.

Another type of access control mechanism is a smartcard authentication mechanism. Smartcards are an attractive approach for user authentication due to their convenient form factor and their ease of use. However, similar to the other control access mechanisms, user authentication is based on the correct operations of the OS initiating an exchange of messages with the smartcard.

These above-described user authentication protocols are subject to a number of disadvantages. For example, due to their OS dependency, they are subject to deliberate virus-based corruption, which could result in the installation of a backdoor to circumvent the authentication software. More specifically, the virus may modify the "login" portion of the OS so that when a special key combination or sequence is entered, user authentication functionality would be entirely bypassed.

Another conventional access control mechanism involves the Basic Input/Output System (BIOS). At start-up, BIOS code is executed by a processor and an entered password is compared with a preprogrammed password stored in battery-backed memory of the BIOS. If the entered password matches a preprogrammed password, the user is granted access to information stored within the computer. This user authentication protocol is subject to (i) deliberate virus-based corruption, (ii) the physical removal and substitution of the memory device containing the BIOS code, and/or (iii) electrical shortage of pins associated with the battery-backed memory in order to bypass user authentication.

Hence, it is desirable for a more robust user authentication technique, independent of the operations of the OS, for controlling access to stored information.

SUMMARY

Briefly, one embodiment of the present invention relates to a Basic Input/Output System (BIOS) device. The BIOS device comprises an internal memory and a state machine. The internal memory contains a BIOS code. The state machine controls access to a portion of the BIOS code in response to authentication of a portable token in communication with the state machine.

BRIEF DESCRIPTION OF THE DRAWINGS

The features and advantages of the present invention will become apparent from the following detailed description of the present invention in which.

DETAILED DESCRIPTION

Figure 1:
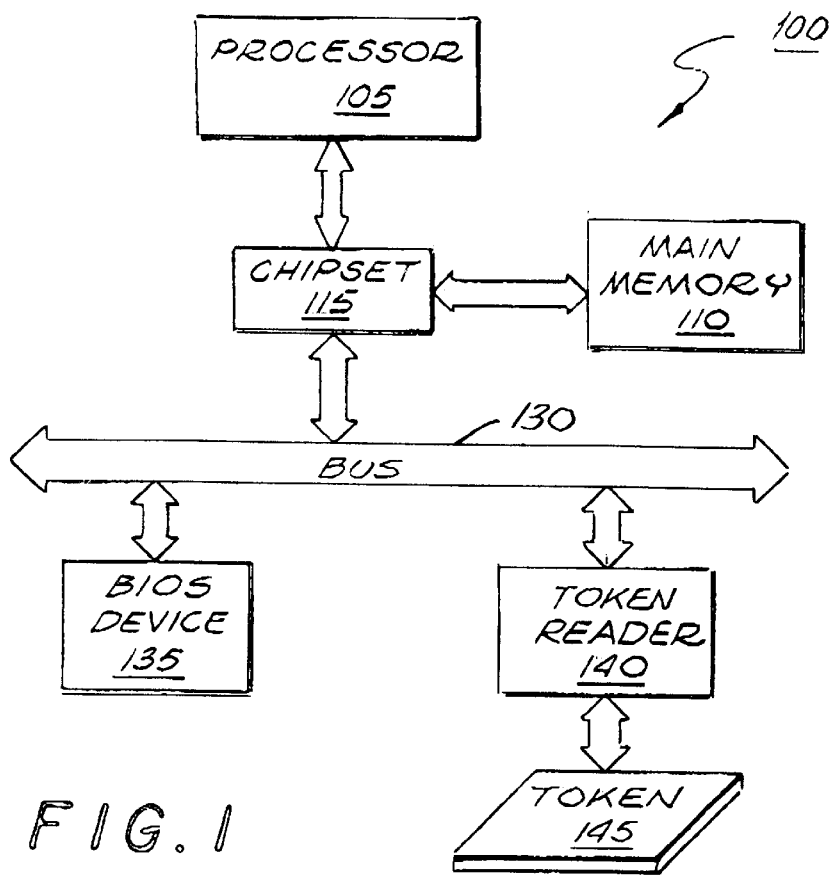
FIG. 1 is a block diagram of an illustrative embodiment of an electronic system utilizing the present invention.

The present invention relates to an electronic system and its corresponding method for controlling access to the electronic system through user authentication. Instead of relying on the operating system (OS) for enforcement of a user authentication protocol, the present invention enforces user authentication at the hardware level. In particular, the enforcement is performed by a device in the electronic system whose continued operation is critical to the correct operations of the electronic system itself. It is contemplated that certain embodiments are set forth in order to provide a thorough understanding of the invention, and should not be construed as a restriction on the scope of the invention. Also, to avoid unnecessarily obscuring the invention, certain well-known logic and techniques are not set forth in detail.

In the following description, certain terminology is used to discuss features of the present invention. For example, an "electronic system" is defined as any hardware having a processor. Examples of an electronic system include, but are not limited or restricted to any of the following: computer (e.g., laptop, desktop, hand-held, server, mainframe, etc.), imaging equipment (e.g., printer, facsimile machine, scanner, digital camera, etc.), set-top box (e.g., television control box for cable or satellite signals), wireless communication equipment (e.g., cellular phone), or a consumer electronic appliance. A "processor" includes logic capable of processing information such as a microprocessor, a microcontroller, a state machine and the like. A "bus" is generally defined as any medium over which information may be transferred such as, for example, electrical wire, optical fiber, cable, plain old telephone system (POTS) lines, wireless (e.g., satellite, radio frequency "RF", infrared, etc.) and the like. "Information" is defined as data, address, control or any combination thereof.

With respect to cryptography related terminology, the term "secure" generally indicates a state where it is extremely difficult for an unauthorized individual to access information in a plain text format. A "key" is generally defined as an encoding and/or decoding parameter usually structured as a sequence of binary data. A "message" is generally defined as information being transferred in a sequence of one or more cycles.

A "digital signature" includes information signed with a private key of its signatory in accordance with a digital signature function. For clarity, one type of digital signature function is the Digital Signature Algorithm (DSA) set forth in a 1998 publication entitled "Federal Information Processing Standards Publication 186-1" (Dec. 15, 1998). A digital signature is used to ensure that the information has not been illicitly modified after being digitally signed. This information may be provided in its entirety or in part after undergoing a one-way hash function. The "one-way hash function" includes a function, mathematical or otherwise, that converts information from a variable-length to a fixed-length (referred to as a "message digest"). The term "one-way" indicates that there does not readily exist an inverse function to recover any discernible portion of the original information from the message digest. Examples of a hash function include MD2 or MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

In addition, a "digital certificate" includes information used to authenticate a sender of information. For example, in accordance with the X.509 v.3 certificate standard, a digital certificate includes information concerning a person or entity being certified (e.g., a key) that is encrypted with the private key of a certification authority. Examples of a "certification authority" include an original equipment manufacturer (OEM), a software vendor, a trade association, a governmental entity, a bank or any other trusted business or person. A "certificate chain" includes an ordered sequence of multiple digital certificates arranged for authorization purposes, where each successive certificate represents the issuer of the preceding certificate.

Referring to FIG. 1, a block diagram of an illustrative embodiment of an electronic system 100 is shown. As shown, electronic system 100 includes at least one processor 105 and a main memory 110 coupled together by a chipset 115. Chipset 115 operates as an interface for a host bus 120, a memory bus 125 and a bus 130. Bus 130 may be implemented as single bus or as multiple buses interconnected through bridge circuitry. Bus 130 may be constructed in accordance with a number of well-known bus architectures, including but is not limited or restricted to a Peripheral Component Interconnect (PCI) bus, an Accelerated Graphics Port (AGP) bus, an Industry Standard Architecture (ISA) bus, an Extended ISA (EISA) bus, or any another type of bus architecture.

A Basic Input/Output System (BIOS) device 135 and a token reader 140 are coupled to bus 130. Token reader 140 is adapted to receive information from a token 145. A "token" is a portable integrated circuit device capable of communicating with token reader 140 such as a smartcard, a pager-sized device transmitting IR or RF signals and the like. For example, where token 145 is a smartcard, token reader 140 includes a port (or bay) sized to accommodate the smartcard. In response to insertion of the smartcard into the port, token reader 140 establishes an electrical connection with the smartcard in order to receive downloaded information from on-card memory (e.g., digital signature, certificate chain, keys, etc.).

Figure 2:
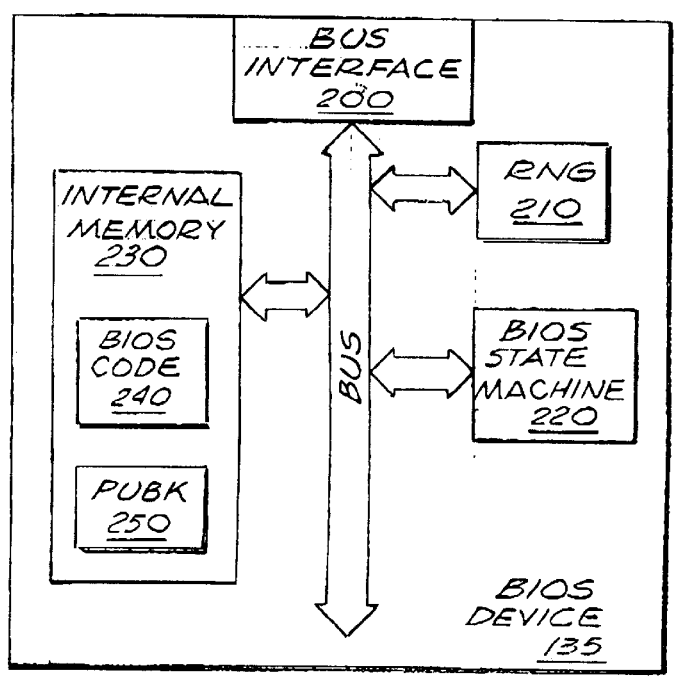
FIG. 2 is a block diagram of a first embodiment of a BIOS device employed within the electronic system of FIG. 1.

Referring now to FIG. 2, a block diagram of a first embodiment of BIOS device 135 is shown. BIOS device 135 comprises a bus interface 200, a random number generator (RNG) 210, a state machine 220, and an internal memory 230 including BIOS code 240. Bus interface 200 provides for the coupling of BIOS device 135 to bus 130. RNG 210 is selected hardware designed to produce a random stream of bits based on environmental conditions such as thermal noise from a resistor or other hardware component for example. It is contemplated, however, that RNG 210 may be implemented as a pseudo-random number generator with a seed value hard programmed into BIOS device 135 at manufacture.

In this embodiment, BIOS state machine 220 controls the user authentication protocol (as described below) and places BIOS device 135 into a LOCKDOWN state as necessary. As further shown in FIG. 3, BIOS device 135 permits access to only a first portion 300 of BIOS code 240 without the presence and subsequent authentication of the token. Normally, instructions associated with the addresses of first portion 300 are fetched upon execution of a legacy reset vector during a boot procedure. If processor 105 of FIG. 1 attempts to access information from a second portion 310 of BIOS code 240 before the token is authenticated, BIOS state machine 220 places BIOS device 135 in the LOCKDOWN state. For example, during the LOCKDOWN state, BIOS device 135 may reset processor 105 of FIG. 1 through direct signaling or insertion of a reset instruction. Other examples include (i) returning no-operation (NOP) instructions to processor 105 until BIOS state machine 220 authenticates the token or (ii) including a subroutine in first portion 300 which, when executed by processor 105, produces a message (visual or audio) to indicate that user authentication has failed and advise the user of corrective actions. Only upon successful authentication of the token, processor 105 is granted access to instructions stored in second portion 310 of BIOS code 240.

Referring back to FIG. 2, in this embodiment, internal memory 230 is nonvolatile memory including BIOS code 240 and one or more public keys 250 of token(s) associated with user(s) having access to electronic system 100. For example, in this embodiment, public key (PUBK) 250 is used by BIOS state machine 220 to recover data from a response message received by electronic system during user authentication. This data is used to determine what users are authorized to access stored information of electronic system 100.

Figure 4:
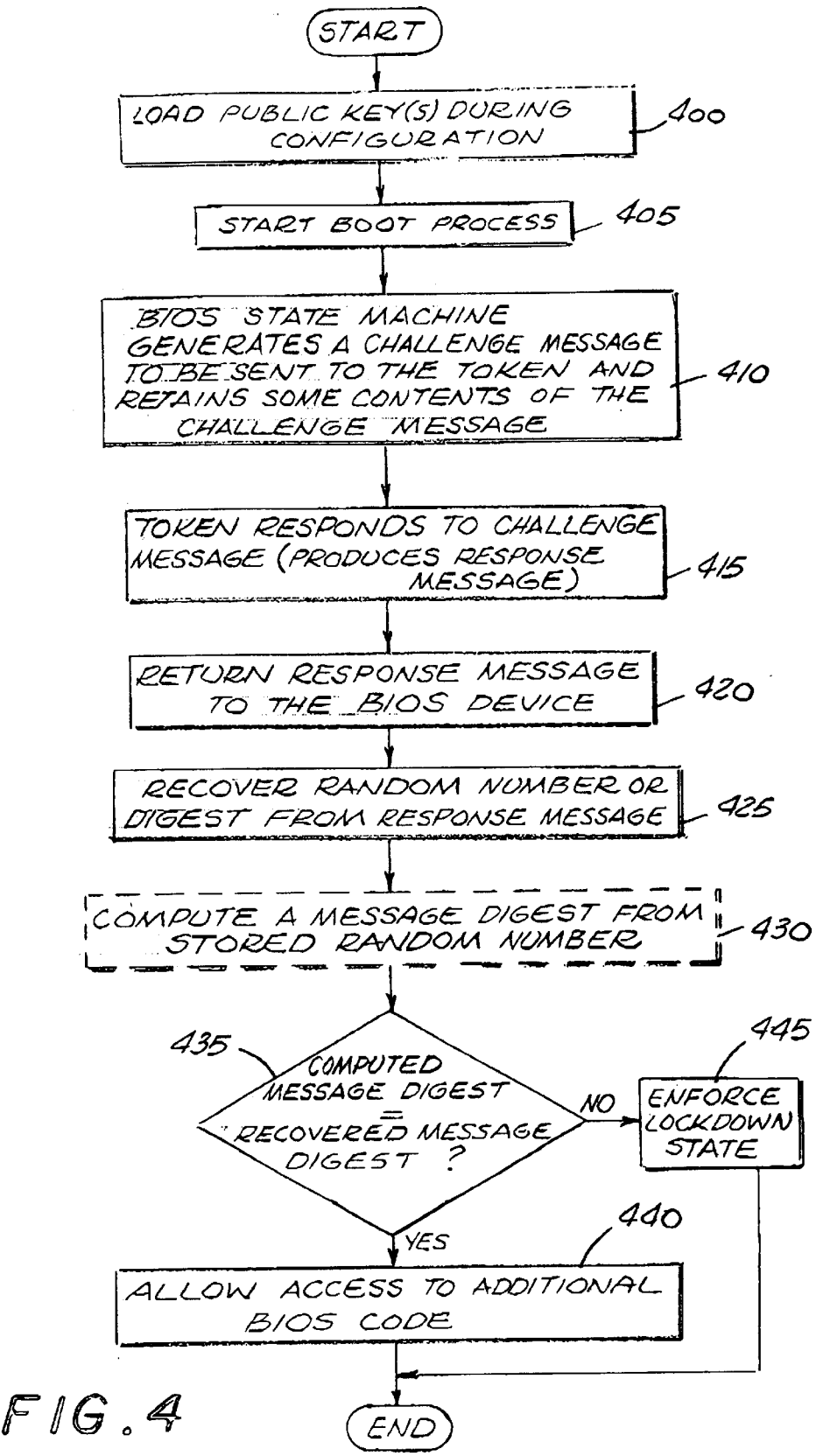
FIG. 4 is a flowchart of a first embodiment of the user authentication protocol performed by the BIOS device of FIG. 2.

Referring now to FIG. 4, a flowchart of a first embodiment of the user authentication protocol performed by the electronic system and the token is shown. During configuration of the electronic system, one or more public keys of authorized users or tokens are loaded in internal memory (block 400). System configuration may be performed by an OEM during manufacture or by the user during initial start-up. After completing system configuration, the user authentication protocol normally is operational after system reset.

As shown in FIG. 4, when powered on, the electronic system commences its normal boot process (block 405).

During the boot process, certain instructions are executed by the processor, which establish rudimentary communications between the BIOS device and the token. In particular, the BIOS state machine of the BIOS device generates a challenge message, which is provided to the token via the processor and the token reader (block 410). A "challenge message" normally includes signals corresponding to a random number generated internally by the RNG within the BIOS device and retained in its internal memory. In this embodiment, the token produces a response message and returns the response message to the BIOS device (blocks 415 and 420). A "response message" includes either the random number or a message digest of the random number digitally signed with a private key (PRKT) of the token.

Thereafter, the BIOS device decrypts the digital signature using a previously stored public key (PUKT) of the token in order to recover the random number or message digest of the random number (block 425). When using message digests, for example, the recovered message digest is compared with the retained random number after undergoing the same hash function performed at the token (blocks 430 and 435). If the digests match, the BIOS device allows the processor to access additional BIOS code from the BIOS device (block 440). Otherwise, continued operations of the electronic system are halted until an authorized token is provided to the electronic system by leaving the electronic system in the LOCKDOWN state (block 445). Although not shown, if hash functions are not used, the recovered random number is merely compared with the retained random number.

Figure 3:
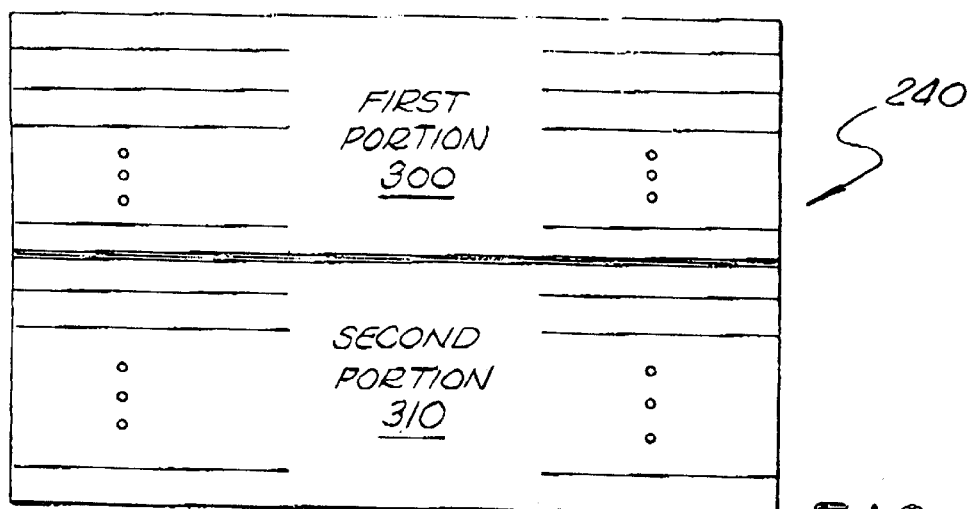
FIG. 3 is a block diagram of the code segmentation of the BIOS device of FIG. 2.
Figure 5:
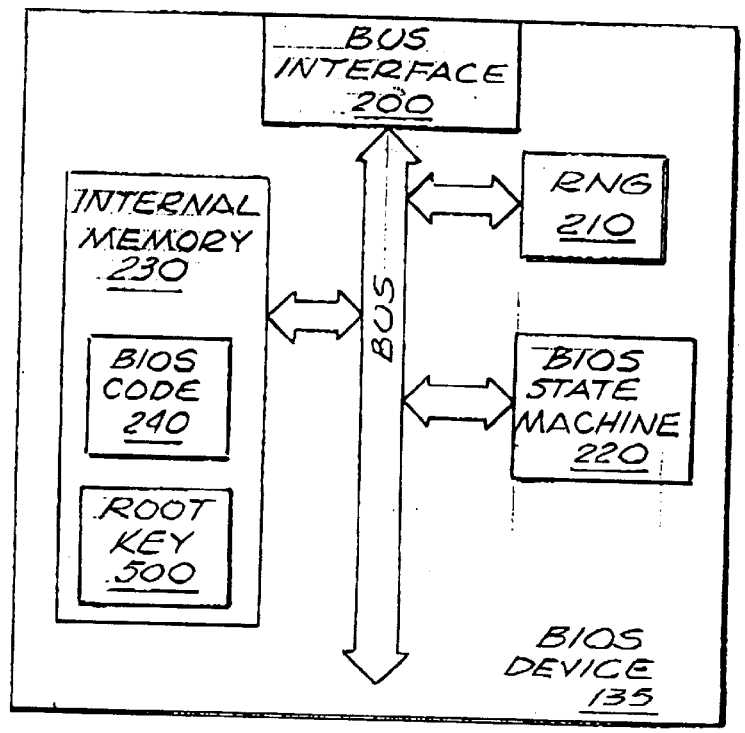
FIG. 5 is a block diagram of a second embodiment of a BIOS device employed within the electronic system of FIG. 1.

Referring to FIG. 5, a block diagram of a second embodiment of BIOS device 135 is shown. BIOS device 135 comprises bus interface 200, RNG 210, BIOS state machine 220, and internal memory 230 containing BIOS code 240 as described above. However, instead of being loaded with one or more public keys associated with token(s) as shown in FIG. 3, internal memory 230 is loaded with a root key 500. Root key 500 is a public key of a certification authority and is used to recover information from an incoming certificate chain returned with a response message. The certificate chain contains a public key to identify the token and/or its user (e.g., PUBK) as described in FIG. 6.

Figure 6:
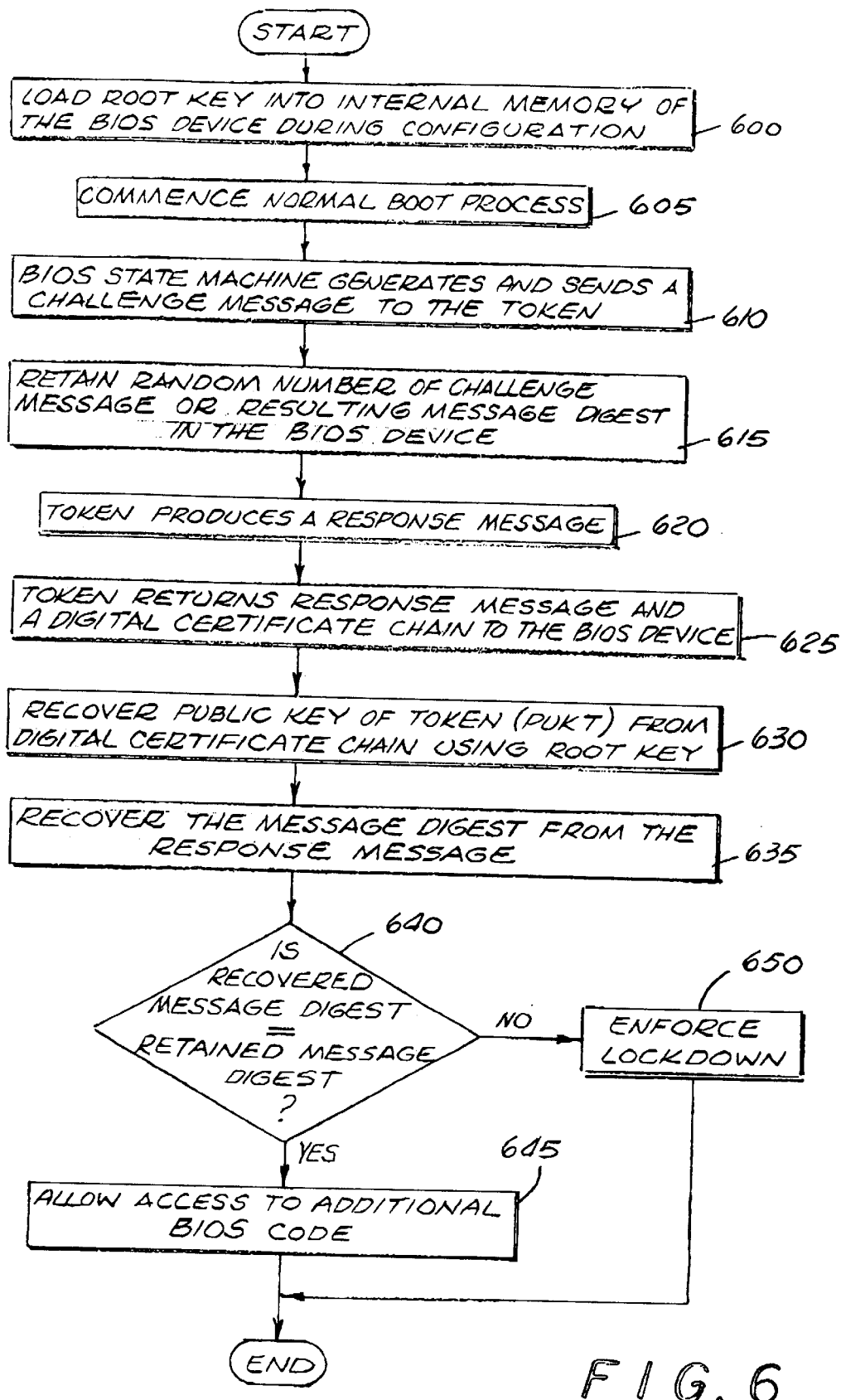
FIG. 6 is a flowchart of a second embodiment of the user authentication protocol performed by the BIOS device of FIG. 5.

Referring now to FIG. 6, a flowchart of a second embodiment of the user authentication protocol performed by the electronic system and the token is shown. During system configuration, the root key is loaded in internal memory of the BIOS device (block 600). After completing system configuration, the user authentication protocol normally is operational after system reset.

As shown in FIG. 6, when powered on, the electronic system commences its normal boot process (block 605). During the boot process, rudimentary communications are established between the BIOS device and the token. In particular, the BIOS state machine generates a challenge message (e.g., a random number), which is provided to the token via the processor and the token reader (block 610). The contents of the challenge message or a form thereof (e.g., message digest) are also retained in internal memory of the BIOS device (block 615). In this embodiment, the token produces a response message and returns the response message, namely a message digest of the random number for example, along with a digital certificate chain to the BIOS device (blocks 620 and 625).

Using the root key, the BIOS state machine decrypts the digital certificate chain to recover a public key associated with the token (PUKT) as shown in block 630. When the digital certificate chain is one certificate, the root key decrypts the certificate to immediately recover PUKT. However, when the digital certificate chain includes multiple certificates, the root key decrypts a first digital certificate to recover a public key that can be used to decrypt the next digital certificate. This iterative process continues until decryption of the last digital certificate recovers PUKT.

Once PUKT is recovered, the message digest is recovered from the response message (block 635). The recovered message digest is then compared with the retained message digest (block 640). If these digests match, the BIOS device allows the processor to access additional BIOS code from the BIOS device (block 645). Otherwise, continued operations of the electronic system are halted by placing the electronic system in the LOCKDOWN state until an authorized token is provided to the electronic system (block 650).

Figure 7:
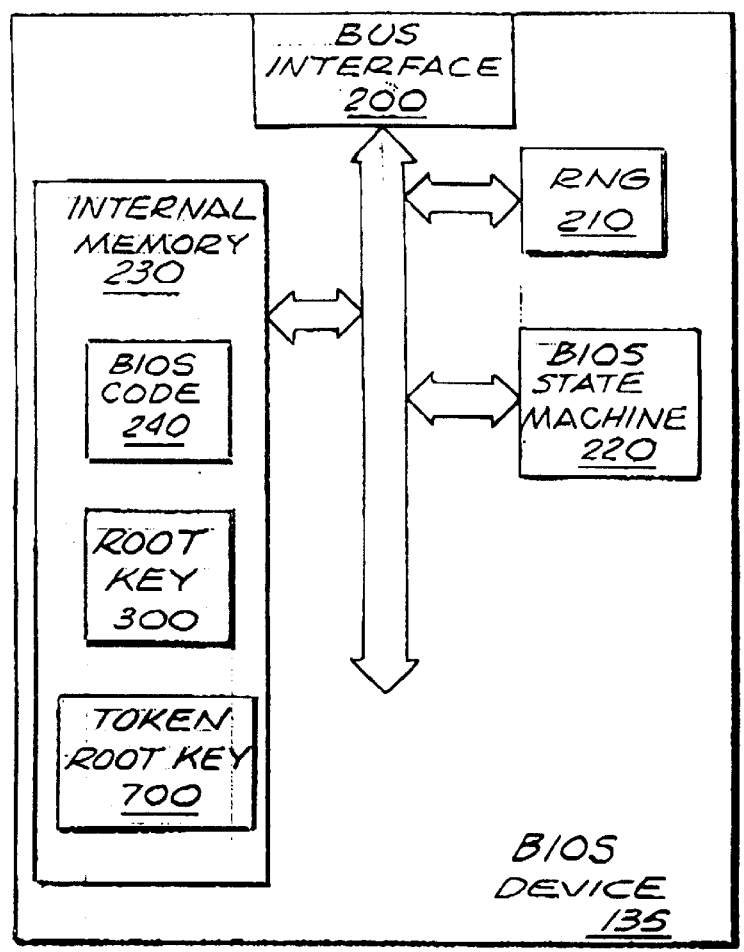
FIG. 7 is a block diagram of a third embodiment of a BIOS device employed within the electronic system of FIG. 1.

Referring now to FIG. 7, a block diagram of a third embodiment of BIOS device 135 is shown. BIOS device 135 comprises bus interface 200, RNG 210, BIOS state machine 220, and internal memory 230 containing BIOS code 240 as described above. Besides storing root key 500, internal memory 230 also contains a token root key 700. In this embodiment, token root key 700 imposes further restrictions on the type of token utilized for the user authentication protocol.

Figure 8:
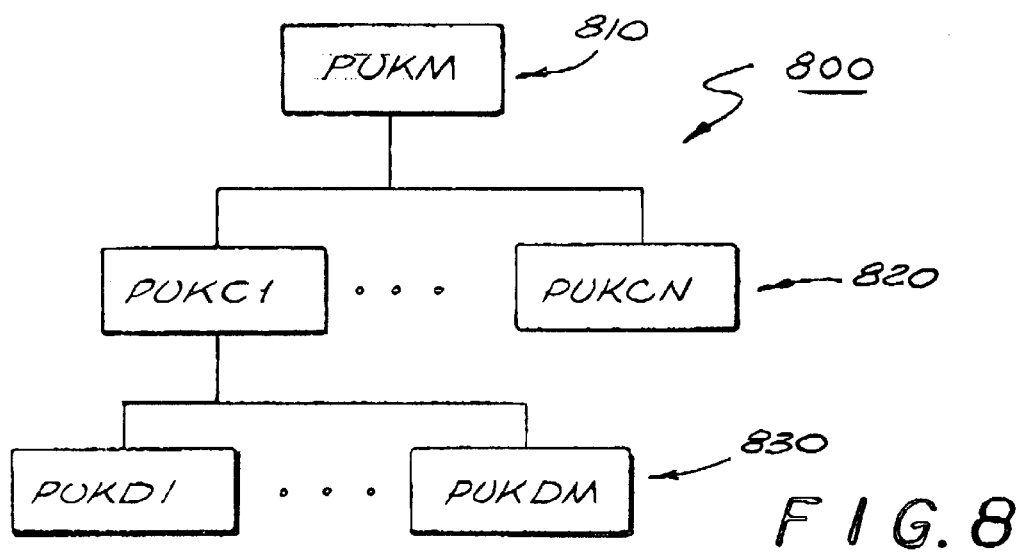
FIG. 8 is a block diagram of the user authentication protocol performed by tokens (smartcards) and the BIOS device of FIG. 7.

For example, as shown in FIG. 8, token root key 700 is employed as a public key associated with a public key hierarchy 800. For this hierarchy 800, a master public key (PUKM) 810 of the token is set as the highest level certification authority. As shown, the manufacturer produces "N" classifications of tokens 820, where "N" is a positive whole number. Each of these token classes 820 is assigned a public key PUKC1, . . . , or PUKCN. This classification may be based on cost parameters, product lines, version numbers or other characteristics. Also, for one or more of these classes 820, it is contemplated that "M" device numbers 830 are assigned to tokens associated with the class(es). Each of these device numbers corresponds to a public key (PUKD1-PUKDM) as shown.

Thus, if PUKM 810 is set as token root key 700, an electronic system employing BIOS device 135 of FIG. 7 could authenticate any class of token, provided appropriate levels of certificate chains accompany the response during the challenge response authentication protocol. If PUKC1 is set as token root key 700, the electronic system would only be able to authenticate M tokens associated with a first classification. In the event that PUKDI is set as token root key 700, the electronic system would only be able to authenticate only one token loaded with assigned PUKD1.

Figure 9:
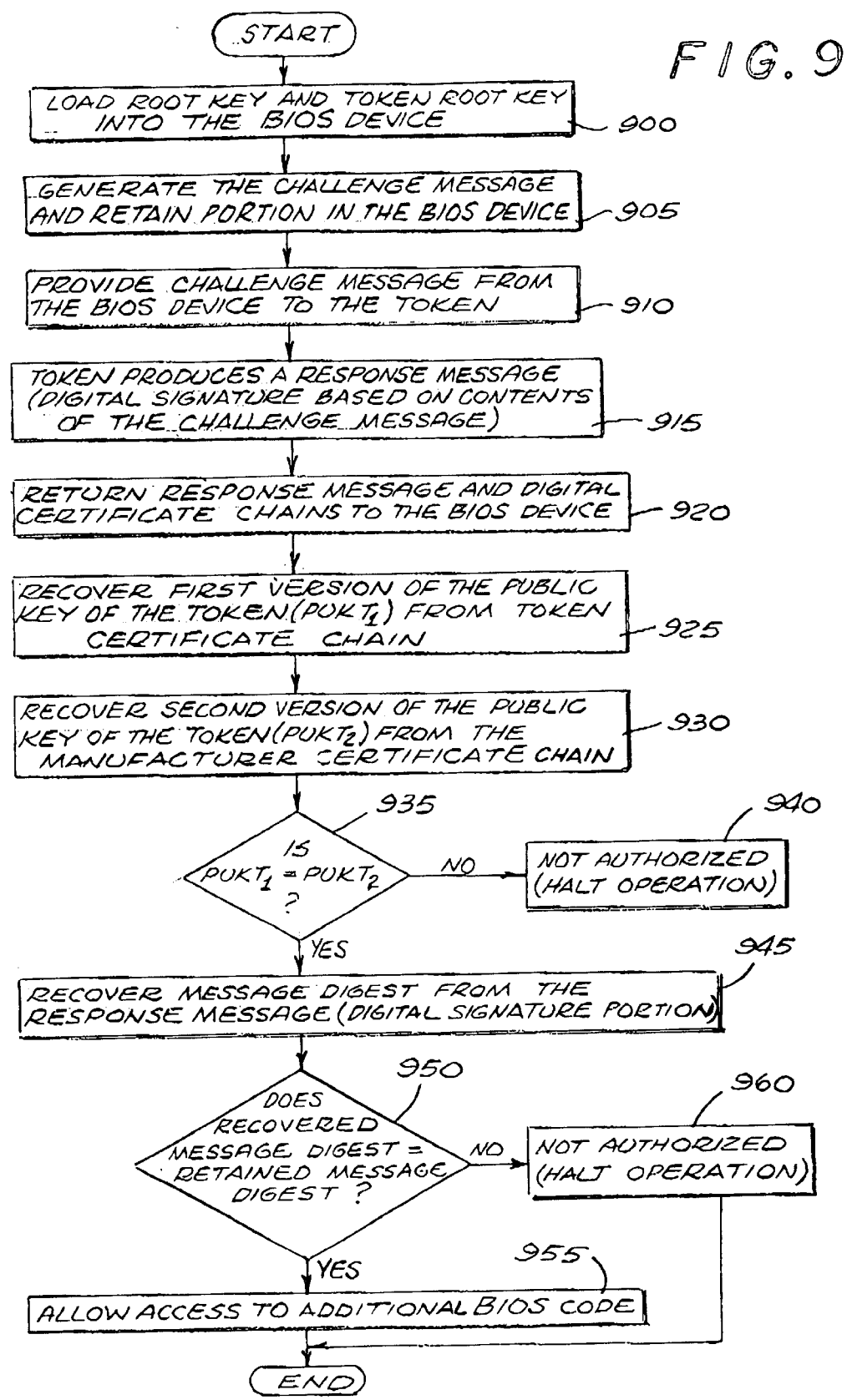
FIG. 9 is a flowchart of a third embodiment of the user authentication protocol performed by the BIOS device of FIG. 7.

Referring now to FIG. 9, a flowchart of a third embodiment of the challenge-response authentication protocol performed by the electronic system and the user-token is shown. During configuration stage, the root key (e.g., public key assigned by the information technology department) and the token root key (e.g., public key loaded by a manufacturer) are loaded in internal NV memory of the BIOS device (block 900). After completion of the configuration stage, the challenge-response authentication protocol can operate.

As shown in FIG. 9, when the electronic system is turned on, initial portions of the BIOS code are executed by the processor, which establishes rudimentary communications between the BIOS device and the token. More specifically, the BIOS state machine generates a challenge message and provides the challenge message to the token and retains at least a portion of the contents of the challenge message (blocks 905 and 910). Herein, the token digitally signs the message to produce a digital signature being the response message (block 915). The digital signature and a pair of pre-loaded digital certificate chains are returned to the BIOS device (block 920). The digital certificate chains include a token certificate chain and a manufacturer certificate chain. The token certificate chain includes a public key of the token certified by a first certification authority. The manufacturer certificate chain includes a digital certificate for each hierarchical level that the token root key is separated from the provided public key of the token.

Using the root key, the BIOS state machine decrypts the token certificate chain to recover a first version of the public key of the token ($PUKT_1$) as shown in block 925. Using the token root key, the BIOS state machine decrypts the manufacturer certificate chain to recover a second version of the public key of the token ($PUKT_2$) as shown in block 930. These versions are compared (block 935). If these versions differ, continued operations of the electronic system are halted until an authorized token is provided to the electronic system (block 940). Otherwise, the message digest associated with the response message is recovered (block 945). The message digest is compared to the retained message digest (or newly calculated message digest based on retained random number) as shown in block 950. If both of these values match, the BIOS device allows the processor to access additional BIOS code (block 955). If these versions differ, continued operations of the electronic system are halted until an authorized token is provided to the electronic system (block 960).

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A Basic Input/Output System (BIOS) device comprising:
   an internal memory to contain a BIOS code; and
   a state machine to control access to a portion of the BIOS code, the state machine permits access to the portion of the BIOS code in response to authentication of a portable token in communication with the state machine.

2. The BIOS device of claim 1 further comprising a random number generator.

3. The BIOS device of claim 2, wherein the random number generator produces signals corresponding to a random number for storage in the internal memory.

4. The BIOS device of claim 1, wherein the state machine precludes access to the portion of the BIOS code until the token is authenticated.

5. The BIOS device of claim 1, wherein the internal memory includes a public key of the token, the public key being used to authenticate the token.

6. The BIOS device of claim 1, wherein the internal memory includes a root key, the root key is a public key of a certification authority used to recover a public key of the token from an incoming digital certificate chain.

7. The BIOS device of claim 6, wherein the internal memory further includes a token root key associated with the token, the token root key is used to authenticate the token if the token belongs to a classification of tokens associated with the token root key.

8. An electronic system comprising:
   a processor;
   a bus;
   a token reader coupled to the bus, the token reader capable of communicating with a portable token; and
   a Basic Input/Output System (BIOS) device coupled to the bus and in communication with the processor, the BIOS device including
      an internal memory to contain a BIOS code,
      a random number generator to produce signals corresponding to a random number, and
      a state machine to control access by the processor to a portion of the BIOS code, the state machine precluding access to the portion of the BIOS code until the token, in communication with the token reader, is authenticated by the state machine.

9. The electronic system of claim 8, wherein the token reader includes a port sized to accommodate and establish an electrical coupling with the token.

10. The electronic system of claim 8, wherein the state machine authenticates the token by issuing a challenge message including the random number to the token reader, storing a representation of the random number in the internal memory, recovering information from an incoming response message from the token, and comparing the information with the representation of the random number.

11. The electronic system of claim 10, wherein the representation includes a message digest being a result produced by loading the random number into a hash function.

12. The electronic system of claim 8, wherein the state machine authenticates the token by issuing a challenge message including the random number to the token reader, storing a representation of the random number in the internal memory, recovering a key from a digital certificate chain provided by the token in response to the challenge message, recovering information from a response message from the token using the key, and comparing the recovered information with the representation of the random number.

13. A method comprising:
   issuing a first message from a state machine employed in Basic Input/Output System (BIOS) device during a boot process;
   storing information from the first message in an internal memory of the BIOS device;
   receiving a second message in response to the first message;
   recovering information from the second message;
   comparing the recovered information with the information stored in the internal memory; and
   permitting access to a selected portion of BIOS code loaded in the BIOS device if the recovered information matches the stored information.

14. The method of claim 15, wherein the first message includes a random number generated by a random number generator within the BIOS device, the random number being the information from the first message stored in the internal memory.

15. The method of claim 14, wherein the second message includes a digital signature including the random number associated with the first message digitally signed with a private key of a token in communication with the state machine of the BIOS device.

16. The method of claim 15, wherein the recovering of the information from the second message includes
   decrypting the digital signature internally within the BIOS device using a public key of the token preloaded in the internal memory of the BIOS device to recover the random number; and comparing the recovered random number with the random number stored in the internal memory.

17. The method of claim 14, wherein the second message includes a digital signature including a message digest based on the random number associated with the first message, the message digest being digitally signed with a private key of a token in communication with the state machine of the BIOS device.

18. The method of claim 17, wherein the recovering of the information from the second message includes decrypting the digital signature internally within the BIOS device using a public key of the token preloaded in the internal memory of the BIOS device to recover the message digest; and comparing the recovered message digest with a result produced after performing a hash operation on the random number with a hash function used to produce the recovered message digest.

19. The method of claim 17, wherein the second message further includes a digital certificate chain including a public key of the token.

20. The method of claim 19, wherein the recovering of the information from the second message includes decrypting the digital certificate chain internally within the BIOS device using a root key preloaded in the internal memory of the BIOS device in order to recover the public key of the token;

decrypting the digital signature internally within the BIOS device using the public key of the token to recover the message digest; and comparing the recovered message digest with a message digest produced by performing operations on the random number in accordance with a hash function used to produce the recovered message digest.

21. The method of claim 17, wherein the second message further includes a token digital certificate chain including a first version of a public key of the token certified by a first certification authority and a manufacturer digital certificate chain including a second version of the public key of the token certified by a second certification authority.

22. The method of claim 21, wherein the recovering of the information from the second message includes decrypting the token digital certificate chain internally within the BIOS device using a root key preloaded in the internal memory of the BIOS device in order to recover the first version of the public key of the token;

decrypting the manufacturer digital certificate chain internally within the BIOS device using a token root key preloaded in the internal memory of the BIOS device in order to recover the second version of the public key of the token;

comparing the first version of the public key with the second version of the public key;

decrypting the digital signature internally within the BIOS device using the first version of the public key of the token to recover the message digest; and comparing the recovered message digest with a message digest produced by performing operations on the random number in accordance with a hash function used to produce the recovered message digest.

23. A program loaded in internal memory of a Basic Input/Output System (BIOS) device for execution by a state machine of the BIOS device, the program comprising:

a first subprogram for issuing a first message from the state machine employed in the BIOS device during a boot process;

a second subprogram for authenticating a portable token in communication with the BIOS device based on contents received from the portable token in response to the first message; and a third subprogram for permitting access to a portion of a BIOS code loaded in the internal memory once the portable token has been authenticated.

24. An apparatus in communication with a portable token, comprising:

means for storing a BIOS code; and means for controlling access to a portion of the BIOS code, for permitting access to the portion of the BIOS code in response to authentication of the portable token, and for precluding access to the portion of the BIOS code until the portable token is authenticated.

25. The apparatus of claim 24 further comprising a random number generator.

26. The apparatus of claim 25, wherein the random number generator produces signals corresponding to a random number for storage in the means for storing.

27. The apparatus of claim 24, wherein the means for storing further stores a public key of the portable token, the public key being used to authenticate the token.

28. The apparatus of claim 27, wherein the means for storing further stores a root key, the root key is a public key of a certification authority used to recover a public key of the portable token from an incoming digital certificate chain.

29. The apparatus of claim 28, wherein the means for storing further stores a token root key associated with the portable token, the token root key is used to authenticate the portable token if the portable token belongs to a classification of tokens associated with the token root key.

* * * * *